UNITED STATES PATENT OFFICE.

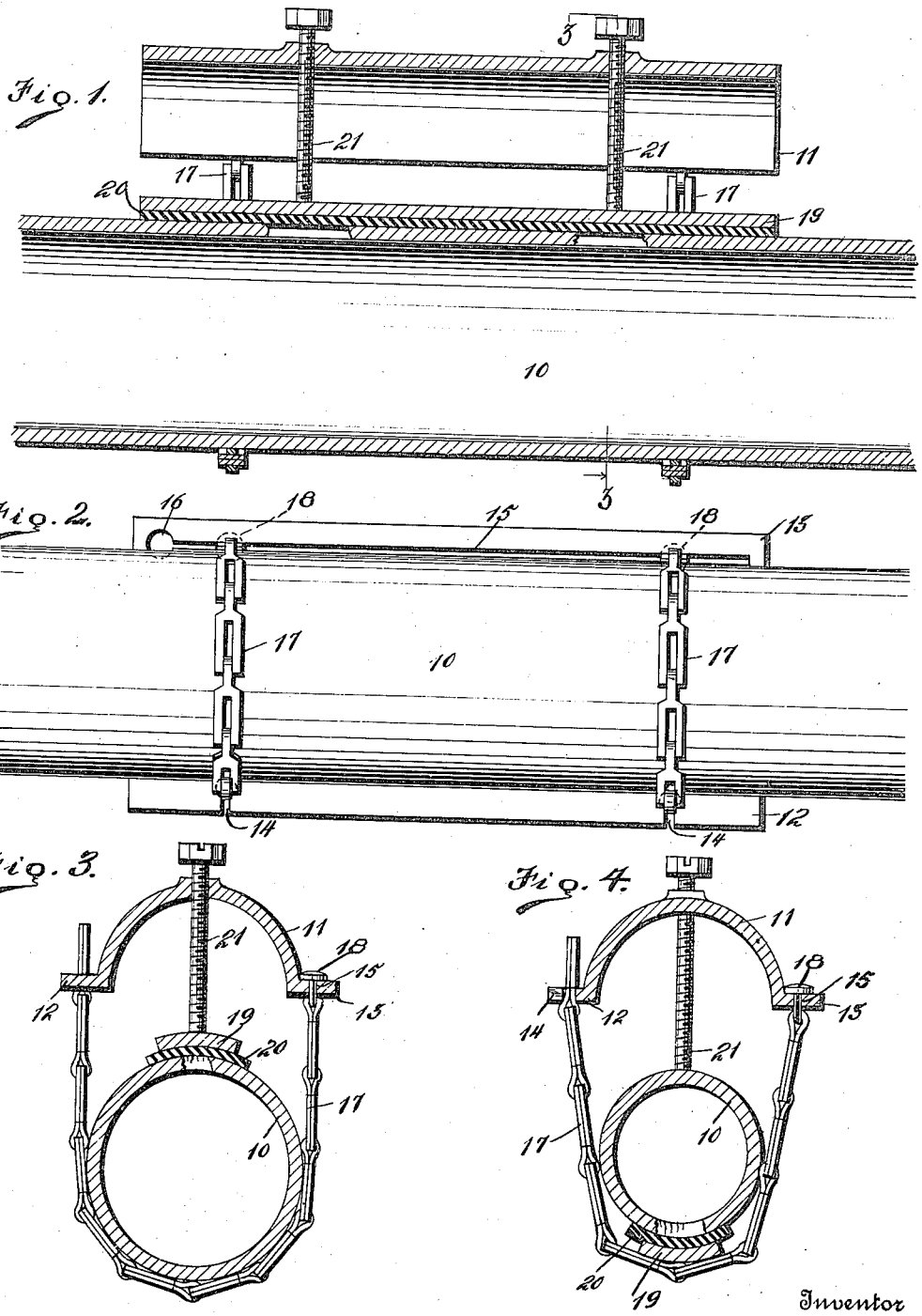

CHARLES F. DOELLNER, OF NEW YORK, N. Y.

REPAIR DEVICE FOR PIPES.

1,045,376.

Specification of Letters Patent.  Patented Nov. 26, 1912.

Application filed May 31, 1912. Serial No. 700,813.

*To all whom it may concern:*

Be it known that I, CHARLES F. DOELLNER, a citizen of the United States, residing at New York city, in the county of New York, State of New York, have invented certain new and useful Improvements in Repair Devices for Pipes; and I do hereby declare the following to be a full, clear, and exact description of the invention, such as will enable others skilled in the art to which it appertains to make and use the same.

This invention relates to improvements in repair devices for water or other pipes.

The principal object is to provide a device of this character which may be quickly and easily applied to a defective or leaking pipe to effectively stop the leak.

A further object is to provide such device having means for tightening the same where it is applied.

These and other objects will be apparent from the following description and with particular reference to the accompanying drawings.

In the drawings: Figure 1 is a vertical longitudinal section of a pipe showing my device applied, Fig. 2 is a bottom plan view of the same, Fig. 3 is a transverse section on the line 3—3 of Fig. 1, Fig. 4 is a transverse section showing the device applied to a smaller pipe, the patch being held directly by the chain.

Referring to the drawings, 10 represents a pipe which is either defective or leaking to which my device is applied.

The repair device comprises a semi-tubular metallic plate 11 having the lateral flanges 12 and 13, in the former of which are formed the open-ended key hole slots 14, while the flange 13 has an elongated slot 15 formed therethrough and extending approximately the entire length of the flange, and terminating at one end in a circular opening 16. A pair of chains 17 are provided, each of which has secured at one end a button or head 18, said buttons being adapted to be inserted through the opening 16 and engage the opposite face of the flange, so that the chains may be moved along the slot to any desired position, the links of the chains being adapted when passed around a pipe to engage in the key hole slots 14, to hold the plate 11 to the pipe.

The device also includes an elongated and transversely curved metal plate 19, and a similarly shaped rubber plate 20. The rubber plate is placed over the defective or leaking part of the pipe, and the plate 19 placed thereover, after which the plate 11 is placed over the plates 19 and 20 and the chains engage in the slots 14, thus holding the parts to the pipe.

So that the plates 19 and 20 will be as tightly clamped against the pipe, I provide the set screws 21 in the plate 11, which are adapted to be screwed against the plate 19 and force the rubber plate 20 tightly against the pipe.

It will thus be seen that the device is simple and can readily be applied to a pipe, and any slack or play which might be occasioned by the chains can be readily taken up by the set screws, and the parts be thus tightly clamped against the pipe to stop the leak. Furthermore, the device is capable of use with pipes of various sizes.

As shown in Fig. 4, the device may be clamped to a smaller pipe, thus making it unnecessary to provide plates 11 of different sizes. In this arrangement the plates 19 and 20 are placed over the opening which is in the lower side of the pipe. The end of the screw 21 then bears directly against the pipe.

What is claimed is:

1. A repair device for pipes comprising a semi-tubular metal plate, a flange on each edge of the plate, one of said flanges having notches formed therein, the other of said flanges having an elongated slot, flexible members held in said slot, said flexible members adapted to be passed around the pipe and engage in the notches of the other flange, a resilient plate disposed against the pipe and over a rent therein, a metallic plate disposed between the resilient plate and the flexible members, and means on the first-named plate for engagement with the third-named plate to adjust the parts tightly against the pipe.

2. A repair device for pipes comprising an elongated and transversely arcuate plate, a laterally extending flange on each edge of the plate, one of the flanges having a longitudinally formed keyhole slot, the other flange having transverse open-ended keyhole slots, chains on each engaged with one end in one of the elongated slots, buttons on the said ends of the chains the opposite end of each of the chains being engaged in one of the transverse slots, a rubber plate engaged over an opening in the pipe, and a tightening screw threaded in the arcuate plate and engaging the said metal plate.

In testimony whereof, I affix my signature, in presence of two witnesses.

CHARLES F. DOELLNER.

Witnesses:
J. A. WILLIAMS,
LEVI E. SCHWAB.